(12) United States Patent
Kubozono

(10) Patent No.: US 10,996,077 B2
(45) Date of Patent: May 4, 2021

(54) ELECTROMAGNETIC INDUCTION TYPE ENCODER

(71) Applicant: Mitutoyo Corporation, Kanagawa (JP)

(72) Inventor: Hiroto Kubozono, Kanagawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 0 days.

(21) Appl. No.: 16/590,641

(22) Filed: Oct. 2, 2019

(65) Prior Publication Data

US 2020/0109966 A1     Apr. 9, 2020

(30) Foreign Application Priority Data

Oct. 4, 2018 (JP) .............................. JP2018-189210

(51) Int. Cl.
  *G01D 5/20*     (2006.01)
(52) U.S. Cl.
  CPC ................................. *G01D 5/2073* (2013.01)
(58) Field of Classification Search
  CPC ..................... G01D 5/2073; G01D 5/2086
  See application file for complete search history.

(56) References Cited

U.S. PATENT DOCUMENTS

| 4,697,144 A * | 9/1987 | Howbrook ............. G06F 3/046 324/207.17 |
| 6,329,813 B1 | 12/2001 | Andermo |
| 2002/0011838 A1 | 1/2002 | Miyata et al. |

FOREIGN PATENT DOCUMENTS

| JP | 2000-180209 A | 6/2000 |
| JP | 2001-255108 A | 9/2001 |
| JP | 2008-032546 A | 2/2008 |

* cited by examiner

*Primary Examiner* — Walter L Lindsay, Jr.
*Assistant Examiner* — Milton Gonzalez
(74) *Attorney, Agent, or Firm* — Rankin, Hill & Clark LLP

(57) ABSTRACT

An electromagnetic induction type encoder includes a detection head and a scale. The detection head has a transmitter coil configured to generate magnetic flux. The scale has connection coils that are arrayed in a measurement axis direction, are configured to be electromagnetically coupled with magnetic flux generated by the transmitter coil and generate magnetic flux that fluctuates in a predetermined spatial period in the measurement axis direction. The detection head has a receiver coil having a plurality of coils that are arrayed in the measurement axis direction on a predetermined face of the detection head, are configured to be electromagnetically coupled with the magnetic flux generated by the connection coils and detect a phase of the magnetic flux. A current direction of one of the plurality of coils is opposite to a current direction of another coil of the plurality of coils next to each other.

3 Claims, 6 Drawing Sheets

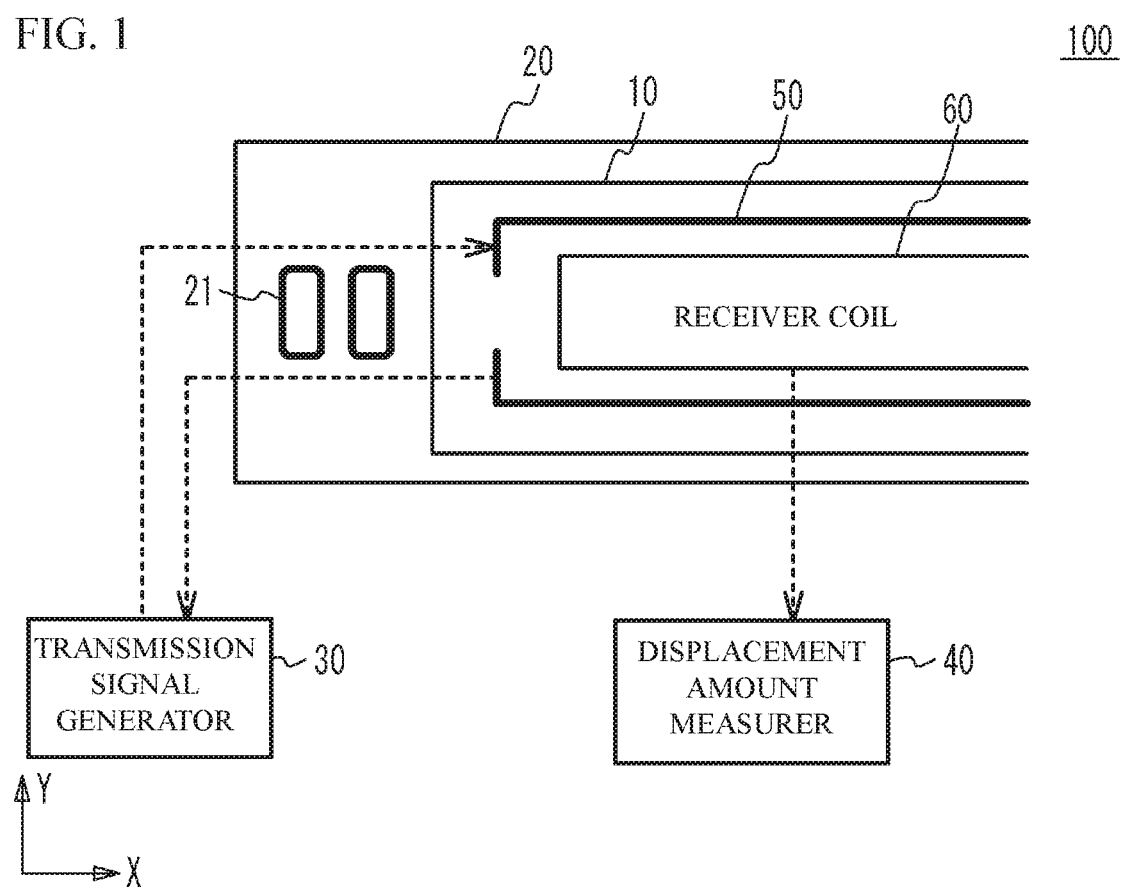

PHASE DIFFERENCE

ELECTROMAGNETIC INDUCTION TYPE ENCODER

CROSS-REFERENCE TO RELATED APPLICATION

This application is based upon and claims the benefit of priority of the prior Japanese Patent Application No. 2018-189210, filed on Oct. 4, 2018, the entire contents of which are incorporated herein by reference.

FIELD

A certain aspect of embodiments described herein relates to an electromagnetic induction type encoder.

BACKGROUND

There is known electromagnetic induction type encoders using electromagnetic connection between a detection head and a scale (for example, see Japanese Patent Application Publication No. 2000-180209, Japanese Patent Application Publication No. 2001-255108, and Japanese Patent Application Publication No. 2008-032546). When a current flows in a transmitter coil of the detection head, magnetic flux is generated. Thus, connection coils of the scale generate an electromotive current. Next, receiver coils of the detection head generate an electromotive current, because of the magnetic flux generated by the electromotive current of the connection coils. Each electromagnetic connection between coils fluctuates in accordance with a relative displacement amount between the detection head and the scale. Thereby, a sine wave signal having the same pitch as that of the connection coils is obtained. When the sine wave signal is electrically interpolated, it is possible to use the sine wave signal as a digital amount of a minimum resolution. Moreover, it is possible to measure the relative displacement amount of the detection head.

SUMMARY

In the electromagnetic induction type encoder, receiver coils have a twisted-pair structure in which "8" shape lies down, in order to suppress influence of external disturbance. In the twisted-pair structure, wirings intersect with each other. Therefore, the twisted-pair structure has two or more wire layers in a printed substrate. However, when positional gap occurs between the two wire layers, an unintentional coil shape may be formed. In particular, when each positional gap in each manufacturing process is different from each other, it is difficult to apply a common correction value with respect to all products. Therefore, sufficient measurement accuracy may not be necessarily achieved in a multi-layer receiver coil.

In one aspect of the present invention, it is an object to provide an electromagnetic induction type encoder that is capable of achieving high measurement accuracy.

According to an aspect of the present invention, there is provided an electromagnetic induction type encoder including: a detection head that has a rectangular shape; and a scale that has a rectangular shape, wherein the detection head faces with the scale and is configured to relatively move with respect to the scale in a measurement axis direction, wherein the detection head has a transmitter coil configured to generate magnetic flux, wherein the scale has a plurality of connection coils that are arrayed in the measurement axis direction, are configured to be electromagnetically coupled with the magnetic flux generated by the transmitter coil and generate magnetic flux that fluctuates in a predetermined spatial period in the measurement axis direction, wherein the detection head has a receiver coil having a plurality of coils that are arrayed in the measurement axis direction on a predetermined face of the detection head and are configured to be electromagnetically coupled with the magnetic flux generated by the plurality of connection coils and detect a phase of the magnetic flux, wherein the plurality of coils are formed so that a current direction of one of the plurality of coils is opposite to a current direction of another coil of the plurality of coils next to each other.

BRIEF DESCRIPTION OF DRAWINGS

FIG. 1 illustrates a structure of an electromagnetic induction type encoder using electromagnetic connection between a detection head and a scale;

DESCRIPTION OF EMBODIMENTS

Figure 2A:
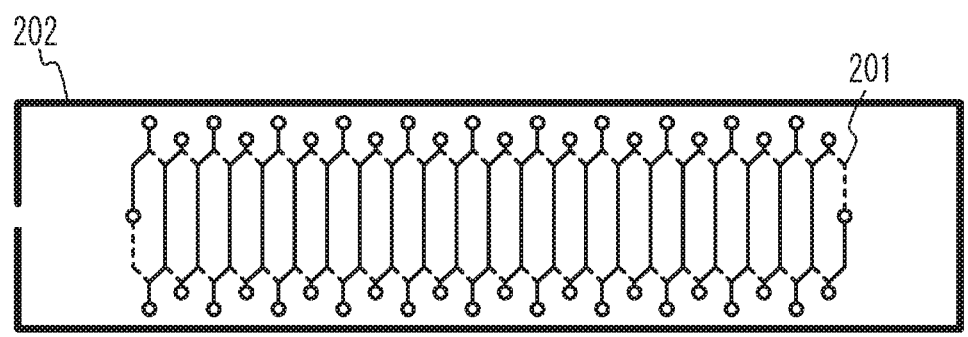
FIG. 2A and FIG. 2B illustrate a multilayer receiver coil.

The following is a description of embodiments, with reference to the accompanying drawings.

FIG. 1 illustrates a structure of an electromagnetic induction type encoder 100 using electromagnetic connection between a detection head and a scale. As illustrated in FIG. 1, the electromagnetic induction type encoder 100 has a detection head 10 and a scale 20. The detection head 10 relatively moves in a measurement axis direction with respect to the scale 20. The detection head 10 and the scale 20 have a flat plate shape and face with each other through a predetermined gap. The electromagnetic induction type encoder 100 has a transmission signal generator 30 and a displacement amount measurer 40 and so on. In FIG. 1, X-axis indicates a displacement direction of the detection head 10 (measurement axis). Y-axis is vertical to the X-axis in a plane formed by the scale 20.

The detection head 10 has a transmitter coil 50, a receiver coil 60 and so on. The transmitter coil 50 is a rectangular coil of which a longitudinal direction is the X-axis. As illustrated in FIG. 1, the receiver coil 60 is inside of the transmitter coil 50. The shape of the receiver coil 60 is described later.

In the scale 20, a plurality of connection coils 21 having a rectangular shape are arrayed in the fundamental period $\lambda$, along the X-axis. Each of the connection coils 21 is a closed loop coil. The connection coils 21 is electromagnetically coupled with the transmitter coil 50 and is also electromagnetically coupled with the receiver coil 60.

The transmission signal generator 30 generates a transmission signal of a single phase AC and supplies the generated transmission signal to the transmitter coil 50. In this case, magnetic flux is generated in the transmitter coil 50. Thus, an electromotive current is generated in the plurality of connection coils 21. The plurality of connection coils 21 are electromagnetically coupled with the magnetic flux generated by the transmitter coil 50 and generate magnetic flux fluctuating in the X-axis direction in a predetermined spatial period. The magnetic flux generated by the connection coils 21 generates an electromotive current in the receiver coil 60. The electromagnetic coupling among each coil fluctuates in accordance with the displacement amount of the detection head 10. Thereby, a sine wave signal of the same period as the fundamental period λ is obtained. Therefore, the receiver coil 60 detects a phase of the magnetic flux generated by the plurality of connection coils 21. The displacement amount measurer 40 can use the sine wave signal as a digital amount of a minimum resolution by electrically interpolating the sine wave signal. Thereby, the displacement amount measurer 40 measures the displacement amount of the detection head 10.

Figure 2B:
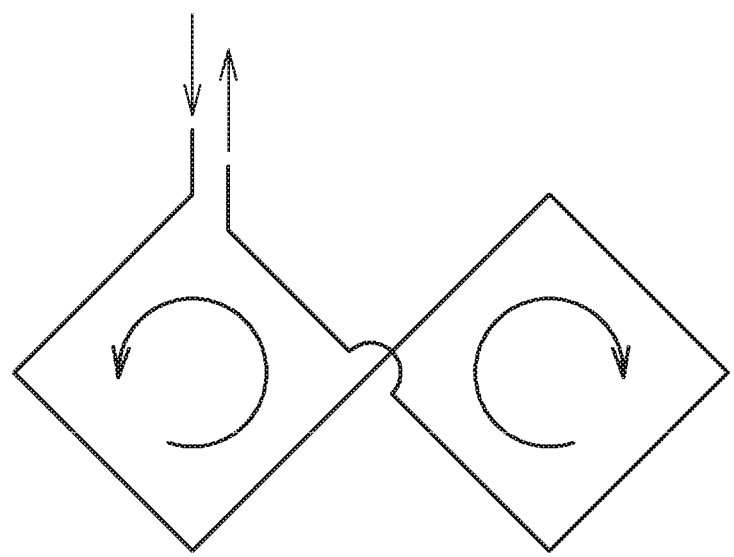

A description will be given of a multilayer receiver coil 201 of a comparative embodiment. FIG. 2A illustrates the multilayer receiver coil 201. The receiver coil 201 is inside of a transmitter coil 202 having a rectangular coil shape. As illustrated in FIG. 2B, the receiver coil 201 has a shape in which "8" lies down. That is, the receiver coil 201 has a twisted-pair structure in which two coils are next to each other and are connected. In the twisted pair structure, a current direction of one of the coils is a clock wise rotation direction, and a current direction of the other is an anti-clockwise direction. In this manner, the current direction of one of the coils is opposite to the current direction of the other. It is possible to suppress external disturbance when the receiver coil 201 has the twisted-pair structure.

Figure 3A:
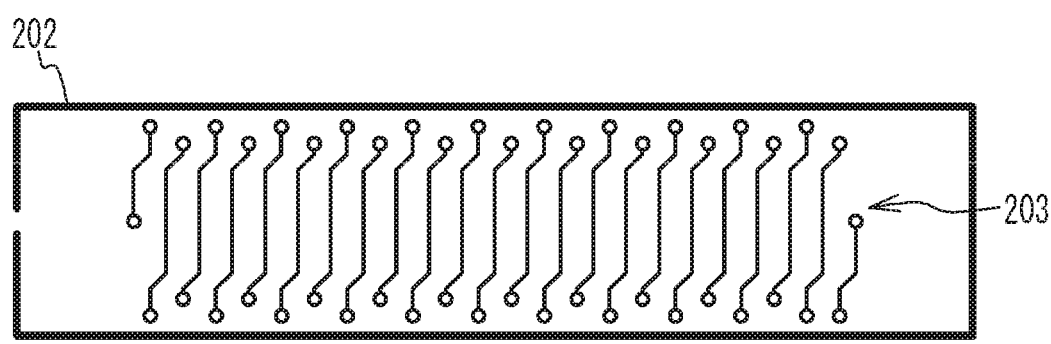
FIG. 3A illustrates a first wiring pattern formed on an upper layer of a printed substrate.
Figure 3B:
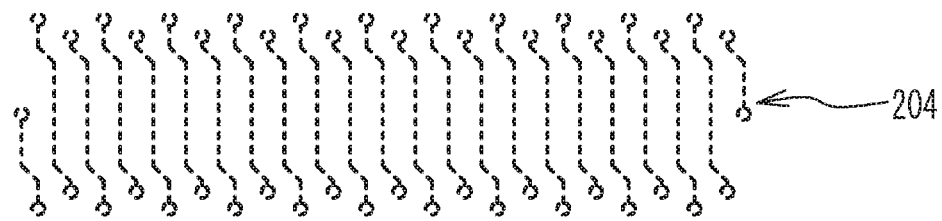
FIG. 3B illustrates a second wiring pattern formed on a lower layer of a printed substrate.

In the twisted-pair structure, two coils intersect with each other at a connection position. Therefore, the twisted-pair structure has a multilayer structure. FIG. 3A illustrates a first wiring pattern 203 formed on an upper layer of a printed substrate. FIG. 3B illustrates a second wiring pattern 204 formed on a lower layer of the printed substrate. The receiver coil 201 has a structure in which the upper layer and the lower layer are bonded with each other, and each of terminals of the first wiring pattern 203 are connected to each of terminals of the second wiring pattern 204 via a through-wiring.

However, when positional accuracy between the upper layer and the lower layer is low, positional gap may occur. In this case, an unintentional coil shape may be formed. And so, it is thought that a correction value is applied in accordance with the unintentional coil shape. However, when each positional gap in each manufacturing of receiver coils is different from each other, it is difficult to apply a common correction value with respect to all products. Therefore, sufficient measurement accuracy may not be necessarily achieved when the multilayer receiver coil 201 is used.

Figure 4A:
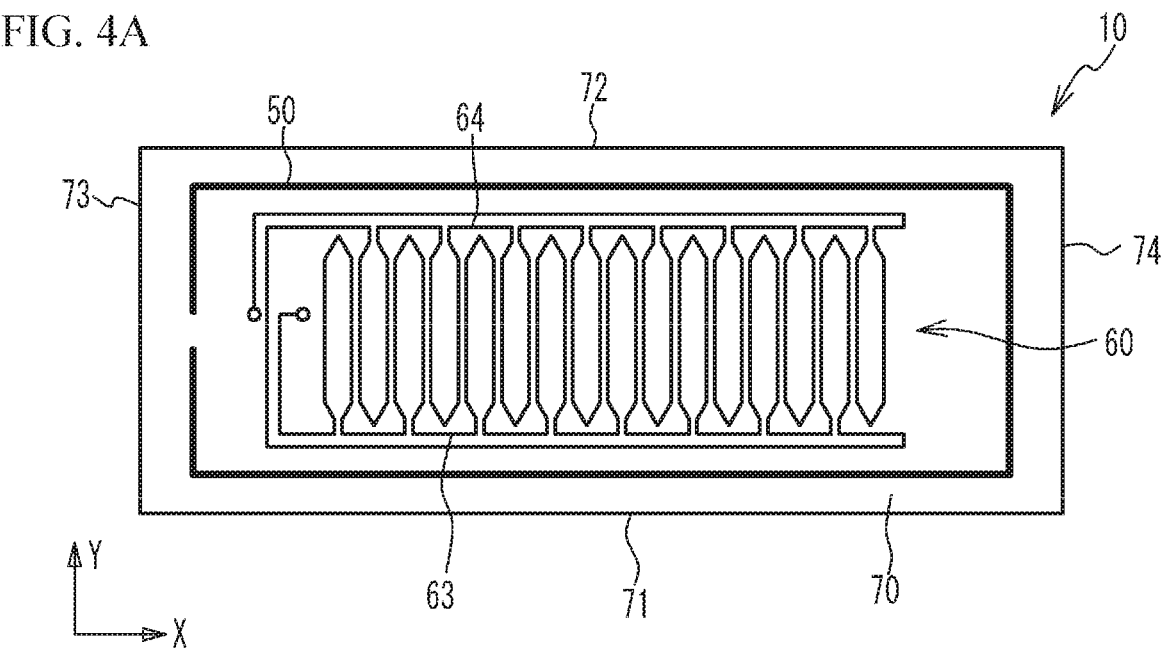
FIG. 4A illustrates details of a detection head.

And so, the receiver coil 60 in accordance with the embodiment has a structure for improving measurement accuracy, FIG. 4A illustrates details of the detection head 10. As illustrated in FIG. 4A, the detection head 10 has a structure in which the transmitter coil 50 and the receiver coil 60 are formed on one face of the substrate 70. For example, the substrate 70 is a printed substrate. The transmitter coil 50 and the receiver coil 60 are printed wiring. The substrate 70 has a length direction in the X-axis direction. In the substrate 70, two side faces in parallel with the X-axis direction are referred to as a first side face 71 and a second side face 72. In the substrate 70, two other side faces other than the first side face 71 and the second side face 72 are referred to as a third side face 73 and a fourth side face 74.

Figure 4B:
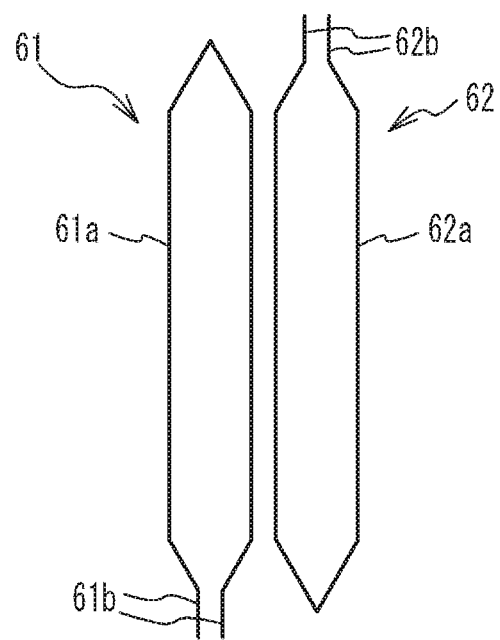
FIG. 4B illustrates details of a coil.

As mentioned above, the transmitter coil 50 has a rectangular coil having a length direction in the X-axis direction. The receiver coil 60 is provided inside of the transmitter coil 50. As illustrated in FIG. 4A and FIG. 4B, the receiver coil 60 has a structure in which each of a plurality of first coils 61 and each of a plurality of second coils 62 are alternately arrayed in the X-axis direction. And, the first coils 61 and the second coils 62 are formed so that a current circulation direction of the first coils 61 is opposite to a current circulation direction of the second coils 62.

As illustrated in FIG. 4B, each of the first coils 61 has an open loop coil 61a in which a wiring is circulated, and a terminal 61b having two wirings which are extracted from the open loop coil 61a to outside. Similarly, each of the second coils 62 has an open loop coil 62a in which a wiring is circulated, and a terminal 62b having two wirings which are extracted from the open loop coil 62a to outside.

For example, the first coil 61 has the terminal 61b on the side of the first side face 71. Each of the terminals 61b is connected to each other via a wiring 63 extending in the X-axis direction. Thus, a current flowing in the wiring 63 flows into one of the wirings of the terminal 61b, circulates in the open loop coil 61a, flows into the wiring 63 via the other wiring of the terminal 61b, flows into one of the wirings of the terminal 61b of the next first coil 61, circulates in the open loop coil 61a and flows into the wiring 63 via the other wiring of the terminal 61b.

For example, the second coil 62 has the terminal 62b on the side of the second side face 72. Each of the terminals 62b is connected to each other via a wiring 64 extending in the X-axis direction. Thus, a current flowing in the wiring 64 flows into one of the wirings of the terminal 62b, circulates in the open loop coil 62a, flows into the wiring 64 via the other wiring of the terminal 62b, flows into one of the wirings of the terminal 62b of the next second coil 62, circulates in the open loop coil 62a and flows into the wiring 64 via the other wiring of the terminal 62b.

When the current direction in the wiring 63 is opposite to the current direction in the wiring 64 in the X-axis direction, the direction of the circulation current in the first coil 61 is opposite to the direction of the circulation current in the second coil 62. For example, the wiring 63 extends from the first coil 61 which is the closest to the third side face 73 toward the fourth side face 74, and is connected to the wiring 64. The wiring 64 extends from the second coil 62 which is the closest to the fourth side face 74 to the third side face 73.

As mentioned above, the receiver coil 60 has a structure in which two coils next to each other in which circulation current directions are opposite to each other are arrayed in the X-axis direction without intersection. Thus, the receiver coil 60 is formed on one face of the printed substrate 70. Therefore, the receiver coil 60 does not have the multilayer structure. Therefore, a process for bonding two printed substrates is omitted. In this case, measurement accuracy for bonding is not needed. This results in improvement of the measurement accuracy of the electromagnetic induction type encoder 100.

Figure 5:
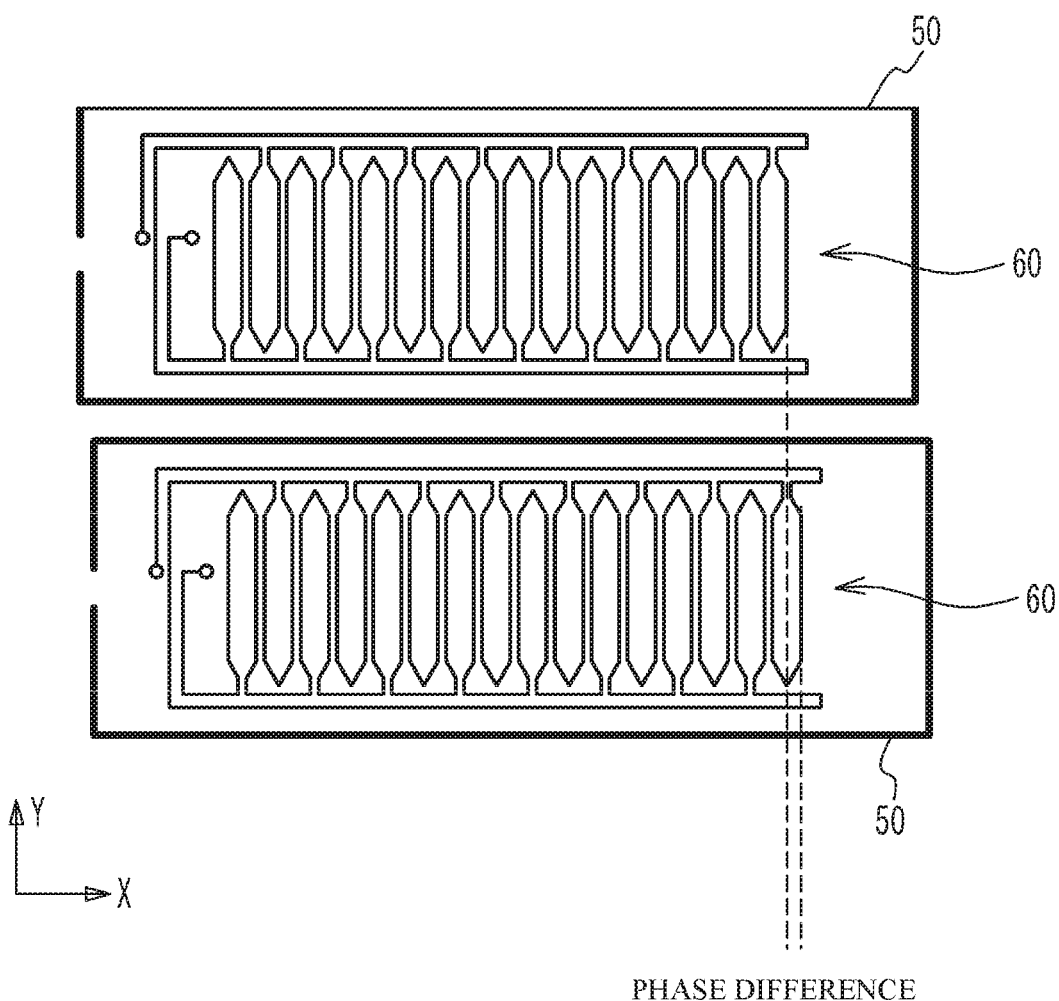
FIG. 5 illustrates two receiver coils.

In order to performing position detection with use of the receiver coil 60, a plurality of the receiver coils 60 of which a phase is different from each other in the X-axis direction are used. FIG. 5 illustrates a case where two of the receiver coils 60 are used. As illustrated in FIG. 5, two of the receiver coils 60 are next to each other in the Y-axis direction on the face of the substrate 70. A phase of one of the receiver coils 60 is different from that of the other in the X-axis direction. That is, each position of coils of one of the receiver coils 60 is different from each position of coils of the other in the X-axis direction.

Each of two transmitter coils 50 surrounds each of the two receiver coils 60. When a pair of the transmitter coil 50 and the receiver coil 60 is provided in a single layer, it is not necessary to separate the transmitter coil 50 and the receiver coil 60 into two printed substrates. In this case, positional gap between the transmitter coil 50 and the receiver coil 60 is suppressed. Therefore, the measurement accuracy of the electromagnetic induction type encoder 100 is improved.

Figure 6:
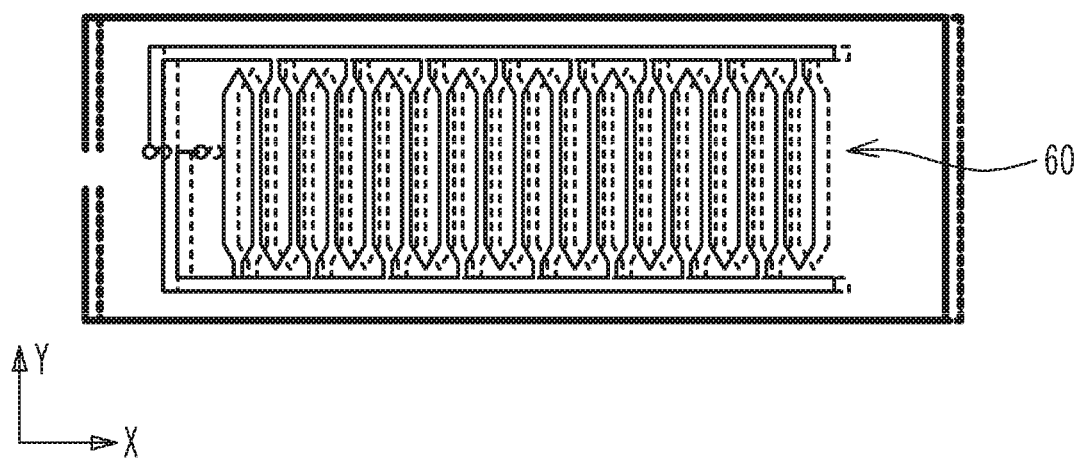
FIG. 6 illustrates two receiver coils.

When the two receiver coils 60 are stacked in a thickness direction of the substrate 70, a two-phase receiver coil can be structured as illustrated in FIG. 6. In the structure of FIG. 6, a distance between one of the receiver coils 60 and the scale 20 is different from that between the other receiver coil 60 and the scale 20. In this case, signal intensity detected by one of the receiver coil 60 is different from that of the other receiver coil 60. It is possible to correct the signal intensity difference in accordance with a difference of the distances.

In the above-mentioned embodiment, the detection head 10 and the scale 20 act as a detection head that has a rectangular shape, the detection head facing with the scale and being configured to relatively move with respect to the scale in a measurement axis direction. The connection coils 21 act as a plurality of connection coils that are arrayed in the measurement axis direction, are configured to be electromagnetically coupled with the magnetic flux generated by the transmitter coil and generate magnetic flux that fluctuates in a predetermined spatial period in the measurement axis direction. The receiver coil 60 acts as a receiver coil having a plurality of coils that are arrayed in the measurement axis direction on a predetermined face of the detection head and are configured to be electromagnetically coupled with the magnetic flux generated by the plurality of connection coils and detect a phase of the magnetic flux.

The present invention is not limited to the specifically disclosed embodiments and variations but may include other embodiments and variations without departing from the scope of the present invention.

What is claimed is:

1. An electromagnetic induction type encoder comprising:
   a detection head that has a rectangular shape; and
   a scale that has a rectangular shape,
   wherein the detection head faces with the scale and is configured to relatively move with respect to the scale in a measurement axis direction,
   wherein the detection head has a transmitter coil configured to generate magnetic flux,
   wherein the scale has a plurality of connection coils that are arrayed in the measurement axis direction, are configured to be electromagnetically coupled with the magnetic flux generated by the transmitter coil and generate magnetic flux that fluctuates in a predetermined spatial period in the measurement axis direction,
   wherein the detection head has a receiver coil having a plurality of coils that are arrayed in the measurement axis direction on a predetermined face of the detection head and are configured to be electromagnetically coupled with the magnetic flux generated by the plurality of connection coils and detect a phase of the magnetic flux,
   wherein the plurality of coils are formed so that a current direction of one of the plurality of coils is opposite to a current direction of another coil of the plurality of coils next to each other,
   wherein the receiver coil is provided on a substrate of the detection head,
   wherein the plurality of coils of the receiver coil are open loop coils,
   wherein the plurality of coils of the receiver coil have a structure in which each of first coils and each of second coils are alternately arrayed,
   wherein the first coils have a terminal on a side of one of side faces of the substrate which is parallel with the measurement axis direction,
   wherein the second coils have a terminal on a side of other of the side faces of the substrate,
   wherein the first coils are connected through the terminal on the side of one of side faces in order, and
   wherein the second coils are connected through the terminal on the side of the other of the side faces.

2. The electromagnetic induction type encoder as claimed in claim 1, wherein each number of the receiver coil and the transmitter coil is two or more,
   wherein each phase of a plurality of receiver coils is different from each other,
   wherein each transmitter coil surrounds each of the plurality of receiver coils.

3. The electromagnetic induction type encoder as claimed in claim 1, wherein the first coils are connected without crossing, and
   wherein the second coils are connected without crossing.

* * * * *